(12) United States Patent
Won

(10) Patent No.: US 7,427,073 B2
(45) Date of Patent: Sep. 23, 2008

(54) ACTIVE ROLL CONTROL SYSTEM USING A MOTOR

(75) Inventor: Sung Jin Won, Yongin-shi (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 259 days.

(21) Appl. No.: 11/133,304

(22) Filed: May 20, 2005

(65) Prior Publication Data

US 2006/0113734 A1  Jun. 1, 2006

(30) Foreign Application Priority Data

Dec. 1, 2004  (KR) ...................... 10-2004-0099638

(51) Int. Cl.
*B60G 21/055* (2006.01)

(52) U.S. Cl. ................... 280/5.507; 280/5.506

(58) Field of Classification Search ............. 280/5.511, 280/5.51, 5.508, 5.507, 5.504, 5.506, 689, 280/124.107; 267/278; 74/10.9, 10.85, 500, 74/424.6, 89.14, 424.7, 724, 425, 458, 89.23
See application file for complete search history.

(56) References Cited

U.S. PATENT DOCUMENTS

| | | | | |
|---|---|---|---|---|
| 2,175,516 A * | 10/1939 | Bugatti | ...................... | 267/272 |
| 2,192,175 A * | 3/1940 | Ballard | ........................ | 60/572 |
| 3,563,106 A * | 2/1971 | Goodman | .................. | 74/89.39 |
| 3,592,075 A * | 7/1971 | Clark | ........................... | 74/498 |
| 4,270,397 A * | 6/1981 | Adams | ...................... | 74/89.18 |
| 4,387,781 A * | 6/1983 | Ezell et al. | ................. | 180/65.3 |
| 4,621,831 A * | 11/1986 | Takadera et al. | ...... | 280/124.106 |
| 4,714,262 A * | 12/1987 | Wood | ..................... | 280/86.758 |
| 4,759,418 A * | 7/1988 | Goldenfeld et al. | ........ | 180/65.1 |
| 4,765,651 A * | 8/1988 | Unger | ........................ | 280/804 |
| 4,815,575 A * | 3/1989 | Murty | ...................... | 188/266.1 |
| 4,898,044 A * | 2/1990 | Galloway | .................. | 74/424.6 |
| 5,079,964 A * | 1/1992 | Hamada et al. | ............ | 74/89.25 |
| 5,186,486 A * | 2/1993 | Hynds et al. | .......... | 280/124.107 |
| 5,491,633 A * | 2/1996 | Henry et al. | .................. | 701/36 |
| 5,746,459 A * | 5/1998 | Giroux et al. | .......... | 292/341.16 |
| 6,227,065 B1 * | 5/2001 | Petersen | ..................... | 74/422 |
| 6,367,826 B1 * | 4/2002 | Klais | ..................... | 280/86.751 |
| 6,419,043 B1 * | 7/2002 | Duval et al. | ................. | 180/444 |
| 6,546,825 B1 * | 4/2003 | Kugle | ........................ | 74/89.23 |
| 6,659,475 B2 * | 12/2003 | Clements et al. | ......... | 280/5.508 |
| 2005/0205342 A1 * | 9/2005 | Tatewaki et al. | ............ | 180/444 |
| 2006/0113734 A1 * | 6/2006 | Won | ....................... | 280/5.511 |

FOREIGN PATENT DOCUMENTS

| KR | 1997-0069433 | 11/1997 |
|---|---|---|
| KR | 2002-0033863 | 5/2002 |

OTHER PUBLICATIONS

English Language Abstract of KR 1997-0069433.
English Language Abstract of KR 2002-0033863.

* cited by examiner

*Primary Examiner*—Eric Culbreth
*Assistant Examiner*—Karen J. Amores
(74) *Attorney, Agent, or Firm*—Greenblum & Bernstein, P.L.C.

(57) ABSTRACT

An active roll control system includes a stabilizer bar, a stabilizer link having a screw gear formed therein, a rack movably connected to the outside of the stabilizer link, and an electric motor connected to the stabilizer link. The rack has a mating screw gear formed in the inner surface thereof to correspond to a screw gear of the stabilizer link.

7 Claims, 2 Drawing Sheets

ACTIVE ROLL CONTROL SYSTEM USING A MOTOR

RELATED APPLICATIONS

The present disclosure relates to subject matter contained in priority Korean Application No. 10-2004-0099638, filed on Dec. 1, 2004, which is herein expressly incorporated by reference in its entirety.

BACKGROUND OF THE INVENTION

1. Field of the Invention

The present invention relates to an active roll control system, in which a stabilizer link having a screw gear formed on the outer circumferential surface thereof rotates by a motor, and a rack combined with the outer side of the stabilizer link is linearly translated in the axial direction of the link in response to the rotation of the stabilizer link so that a stabilizer bar fixed to the rack at one end thereof can be controlled, thereby enabling an active control of the active roll control system.

2. Description of the Related Art

In general, a suspension system of the vehicle connects the axle shaft and the body with each other, and controls vibration and shock from the road surface while driving so as not to be transferred directly to the body, thereby protecting the body and freight and also providing a comfortable ride. The suspension system comprises a chassis spring which relieves shock transferred from the road surface, a shock absorber which serves comfortable feelings by controlling the free vibration of the chassis spring, and a stabilizer which prevents rolling of the vehicle.

Here, the stabilizer is mounted on right and left lower arms, or on a strut bar. It does not operate in the case where the wheels at both sides move up and down simultaneously, but when the wheels vertically move relative to each other, it operates such that it is tilted and the resultant restoring force of the spring can reduce the tilt of the vehicle body.

Accordingly, in the case where the vehicle is tilted to one side due to the centrifugal force while turning, or both side wheels are at different heights relative to each other while driving over the bump or by rebounding, the vehicle is quickly stabilized as the stabilizer bar is twisted and provides a restoring force.

However, the conventional way of roll control, which uses only an elastic restitution of the stabilizer bar to prevent the vehicle against tilt or to make the tilted vehicle to be returned, is not so quick and accurate. A new system employing a hydraulic cylinder connected to a distal end of the stabilizer bar has been developed to solve the above problem and to provide an active roll control.

As described above, the new system for an active roll control using a hydraulic system is described in detail in Korean Patent Laid-Open Publication Nos. 1997-0069433 and 2002-0033863, which is briefed below.

As illustrated in FIG. 1, the conventional stabilizer bar 101 is connected at both ends to lower arms of the right and left sides, and the middle section thereof is supported by the chassis frame 103. Therefore, it does not operate in the case where the wheels at both sides move up and down simultaneously, but it operates when the wheels move vertically relatively to each other such that it is tilted and the resultant restoring force of the spring can reduce the tilt of the vehicle body, thereby maintaining the balance of the vehicle.

The above-described stabilizer bar 101 is connected to the lower arm 102 by a stabilizer link 106, which has the form of a simple steel rod with a ball joint formed at both ends thereof.

As illustrated in FIG. 2, it is known an improved mechanism, in which the stiffness of the stabilizer bar varies with the length of the stabilizer link. FIG. 2 shows a stiffness variable mechanism of a general hydraulic stabilizer, in which a piston rod 112 is connected to a ball joint 110 in which the stabilizer bar 101 is installed, and a cylinder 116 moving together with a piston 114 formed at the end of the piston rod 112 is linked to a ball joint 118 connected to the lower arm. The cylinder 116 is filled with oil 120 and has a neutral port 122 and top and bottom ports 124 and 126, which are fluid-communicated with each other by a bypass path 128, in which an operation check valve 130 is installed in order to control the moving state of the oil.

Also, an accumulator 132 having a gas filled therein through a diaphragm is installed in the bypass path 128. The accumulator 132 serves to adjust the volume difference in the inner space of the cylinder 116, which occurs when the piston rod moves in to and out of the cylinder 116, and also to prevent an occurring of cavitation by developing a certain level of oil pressure.

In the above stiffness variable mechanism, in the case where the speed of the piston 114 is relatively low due to the low frequency of disturbance from the lower arm, the piston 114 moves freely inside the cylinder 116, and thus no input is loaded to the stabilizer 101, so that the roll stiffness of the stabilizer is lowered. In the case where a big input beyond a stroke of the piston rod 112 is loaded, or the piston moves at the speed of the extent to close the operate check valve 130, the oil path is blocked by the operation check valve 130, and thus the piston stroke is controlled so that the stabilizer 101 returns to the normal stiffness thereof, thereby preventing the rolling.

However, the above system requires various complicated devices used for the additional hydraulic control, so that the whole system becomes complicated and results in an increased manufacturing cost.

SUMMARY OF THE INVENTION

Therefore, the present invention has been made in view of the above problems occurring in the prior art, and it is an object of the present invention to provide an active roll control system, in which an electric motor is employed instead of the conventional hydraulic system, so that a quick roll control can be achieved, along with its simple structure.

In order to accomplish the above object, according to the invention, there is provided an active roll control system including a stabilizer bar and a stabilizer link connected to the stabilizer bar. The active roll control system of the invention includes: a stabilizer link having a screw gear formed therein; a rack movably connected to the outside of the stabilizer link, the rack having a mating screw gear formed on the inner surface thereof to correspond to a screw gear of the stabilizer link; and an electric motor connected to the stabilizer link.

The rack may includes an outer hollow tube and an inner hollow tube, and a bush placed between the outer and inner hollow tubes.

Preferably, a stopper that prevents the rack from being loosened may be connected to an end portion of the stabilizer link.

The stopper is provided with a screw portion with a thread formed therein, the screw portion being screwed into the groove formed in the end portion of the stabilizer link to thereby combine the stabilizer link with the stopper.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
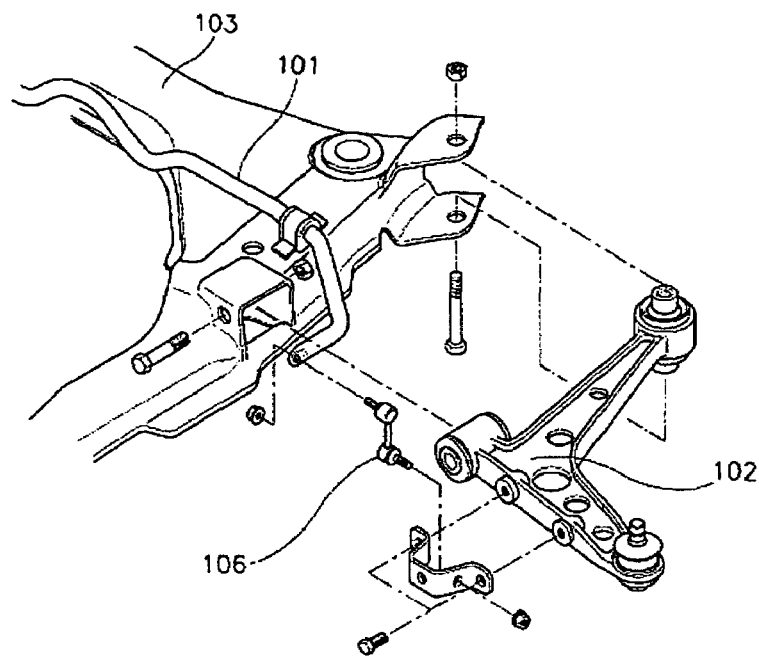
FIG. 1 shows a schematic structure of a stabilizer mounted on the vehicle.
Figure 2:
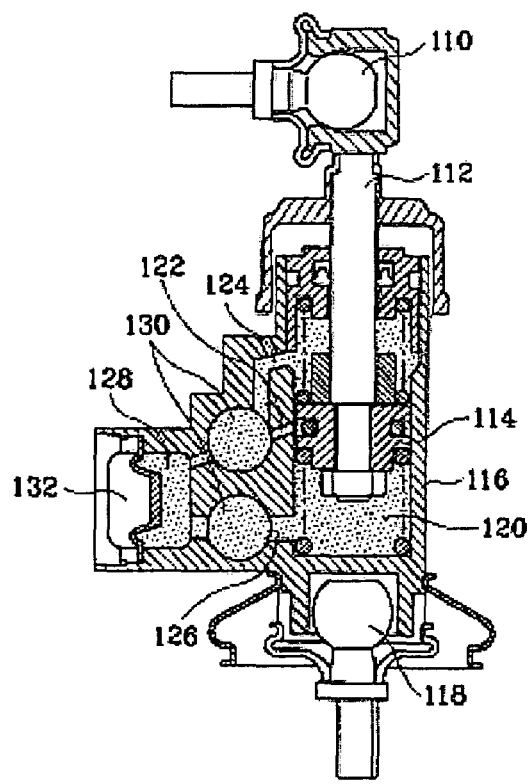
FIG. 2 is a cross-sectional view of a conventional hydraulic stabilizer link.

The preferred embodiments of the invention will be hereafter described in detail, with reference to the accompanying drawings. It is noted that details on the well-known components and their functions will not be described.

Since it is a well-known conventional technology that a stabilizer bar is connected to lower arms of right and left sides and a strut bar by a stabilizer link, and the major point of this invention lies in the construction of a stabilizer link assembly, detailed description on the connection structure of a general stabilizer bar will be omitted. The subject matter of the invention, that is, the construction of the stabilizer link assembly is described in detail. The same reference numeral is used for the same element of the construction.

Figure 3:
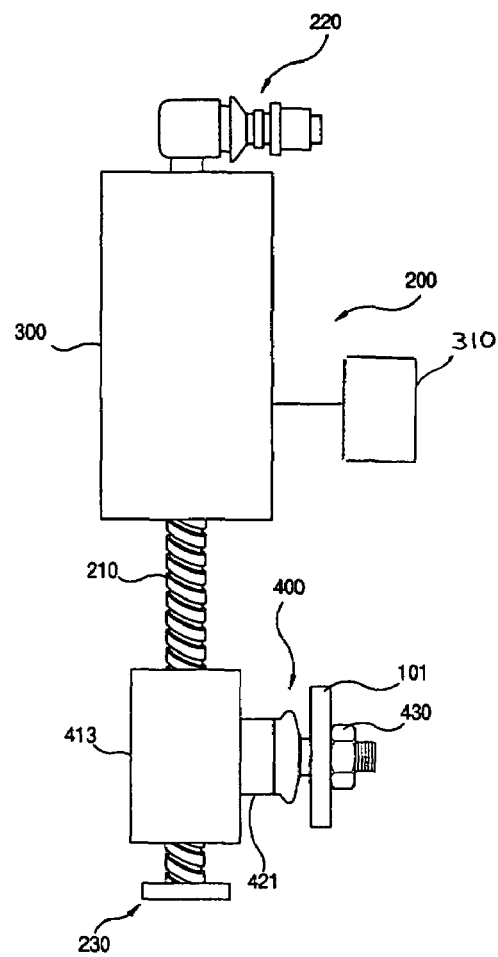
FIG. 3 is a side view of a link according to the present invention.
Figure 4:
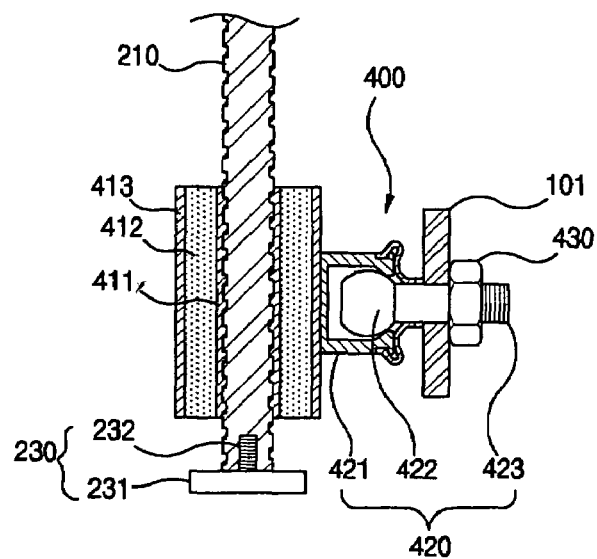
FIG. 4 is a cross sectional view of a rack and a stopper.

FIG. 3 illustrates the stabilizer bar 101 of the invention, which is connected to the stabilizer link 200. FIG. 4 is an enlarged cross sectional view of part of the stabilizer bar in FIG. 3.

The stabilizer link 200 includes a rod 210, a connector 220 for connecting the rod 210 to the car body, and a stopper 230 for preventing a rack 400 (described hereinafter) from separation at the bottom of the rod 210.

The connector 220 is formed in the upper portion of the stabilizer link 200, and it connects the rod 210 to a lower arm or a strut bar on the car body. In the connector 220, a ball joint is used as in the conventional stabilizer link, but as described above, details on the connecting structures of the stabilizer link 200 to the car body will be omitted since it is a well-known conventional technology.

The rod 210 is connected to a motor 300, and is constructed such that it is rotated as the motor 300 rotates.

The rod 210 is provided with a screw gear formed on the outer circumferential surface thereof, and the connector 220 is formed on one end of the rod, and a groove for mounting the stopper 230 is formed on the other end of the rod.

The stopper 230 includes a head portion 231 having a round or angled-shape and a diameter larger than the rod, and a screw portion 232 having a thread formed therein. The screw portion 232 is inserted and screwed into the groove on the rod 210 to thereby hold the rack 400, which will be hereinafter described.

A rack 400 is mounted on the outside of the rod 210. As shown in FIG. 4, the rack 400 includes inner and outer hollow tubes 411 and 413 having different diameters, a bush 412 placed between the both tubes 411 and 413, and a stabilizer bar mounting assembly 420 formed in the side face of the outer hollow tube 413. A mating screw gear corresponding to the screw gear on the rod is formed in the inner surface of the inner hollow tube 411. Since the screw gear formed on the outer circumferential surface of the rod 210 is engaged with the screw gear formed on the inner circumferential surface of the inner hollow tube 411, the rack 400 moves in an axial direction as the rod 210 rotates.

At one side of the rack is formed a stabilizer bar mounting assembly 420, which serves to interconnect the rack 400 and the stabilizer bar 101 through a ball joint. The stabilizer bar mounting assembly 420 includes a ball housing 421, a ball 422 placed in the ball housing 421, and a joint rod 423 integrally formed with the ball 422. As shown in FIG. 1, there is a through-hole at the end portion of the stabilizer bar, and a joint rod 423 with the screw threads formed thereon is inserted into the through-hole of the stabilizer bar 101, and then a nut 430 is connected thereto such that the stabilizer bar 101 is fixed to the rack 100.

The active roll control system having the above-described construction can actively control the stabilizer bar by applying a torque to the stabilizer bar 101 in such a way that the rack 400 is translated by the screw gear as the motor 300 is operated, when a sensor 310 senses a rolling in the car.

Besides the rolling during the turning the car, when an impact is sensed by the sensor 310, an active control is carried out due to the same construction as described above. In this case, if the supply of power to the motor is blocked, the rack can be moved freely so that the active roll control system can perform its function properly.

The effects of the present invention are summarized as below:

First, the active roll system of the invention has a simplified structure, as compared with the conventional hydraulic active roll control system, and therefore, the manufacturing cost can be reduced, and more accurate control can be achieved.

Second, even in case of an instantaneous impact from the road surface, because the sensor 310 senses the instantaneous impact caused by the road condition, the rack can be actively controlled by the motor, and therefore, the active roll control system of the invention can be fully functioned under any circumstance.

Third, the rack is constructed in such a way as to include a bush having elasticity, and thus the active roll control system of the invention can easily absorb the shock.

Fourth, the stopper and the rod have a simple connection structure by means of a bolt, thereby enabling an easy assembling and maintenance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An active roll control system, comprising:
   a stabilizer bar;
   a stabilizer link including a rotatable rod having a screw gear formed thereon;
   a rack movably connected to the rod of the stabilizer link, the rack having a matching screw gear formed on an inner surface thereof to correspond to the screw gear of the rod, the matching screw gear configured to directly engage the screw gear of the rod,
   the rack further comprising a hollow outer tube configured to receive the rod therein and a stabilizer bar mounting assembly connected to an outer surface of the hollow tube, the stabilizer bar mounting assembly configured to connect the stabilizer bar to the rack; and
   an electric motor connected to the stabilizer link to rotate the rod.

2. The active roll control system according to claim 1, wherein the rack further comprises a hollow inner tube positioned within the hollow outer tube, and a bush positioned between and engaging both the hollow outer and hollow inner tubes.

3. The active roll control system according to claim 1, wherein a stopper that prevents the rack from separating from the stabilizer link is connected to an end portion of the stabilizer link.

4. The active roll control system according to claim 2, wherein a stopper that prevents the rack from separating from the stabilizer link is connected to an end portion of the stabilizer link.

5. The active roll control system according to claim 3, wherein the stopper is provided with a screw portion with a thread formed therein, the screw portion being screwed into a groove formed in the end portion of the stabilizer link to thereby combine the stabilizer link with the stopper.

6. The active roll control system according to claim 4, wherein the stopper is provided with a screw portion with a thread formed therein, the screw portion being screwed into a groove formed in the end portion of the stabilizer link to thereby combine the stabilizer link with the stopper.

7. The active roll control system according to claim 1, wherein the motor is further connected to a sensor that senses a movement to activate operation of the motor.

* * * * *